United States Patent [19]

Rogers

[11] Patent Number: 4,574,106
[45] Date of Patent: Mar. 4, 1986

[54] SELF MOLDING FIBERGLAS

[76] Inventor: Jimmy H. Rogers, P.O. Box 362, Point Clear, Ala. 36564

[21] Appl. No.: 636,104

[22] Filed: Jul. 30, 1984

[51] Int. Cl.4 .................. B32B 5/26; B32B 17/02; B32B 17/06; B32B 17/12
[52] U.S. Cl. ................... 428/236; 52/169.7; 114/65 R; 156/187; 206/524.6; 220/DIG. 23; 428/251; 428/285; 428/302; 428/318.8; 428/319.1
[58] Field of Search ............... 428/236, 251, 285, 302, 428/318.8, 319.9

[56] References Cited

U.S. PATENT DOCUMENTS

| 2,577,205 | 12/1951 | Meyer et al. | 428/236 |
| 3,397,117 | 7/1968 | Zolog et al. | 428/236 |
| 4,302,499 | 11/1981 | Grisch | 428/285 |
| 4,310,587 | 1/1982 | Beaupre | 428/285 |
| 4,312,909 | 1/1982 | Shaw | 428/285 |
| 4,323,620 | 4/1982 | Iwabuchi et al. | 428/285 |
| 4,358,503 | 11/1982 | Homeyer | 428/285 |
| 4,416,929 | 11/1983 | Krueger | 428/285 |
| 4,501,787 | 2/1985 | Marchetti et al. | 428/285 |

FOREIGN PATENT DOCUMENTS 48306 6/1983 Japan.
1370786 10/1974 United Kingdom.

Primary Examiner—James C. Cannon

[57] ABSTRACT

A self molding fiberglas to be used for building boats, swimming pools, spas, liquid storage tanks and pipes that eliminates the building of a mold first.

3 Claims, 4 Drawing Figures

SELF MOLDING FIBERGLAS

BACKGROUND OF THE INVENTION

All resin saturated fiberglas products are built from a mold and laid up in several steps. This product is designed to be self molding and laid up in one step.

SUMMARY OF THE INVENTION

This invention will cut the labor costs in building a boat in half or less than half. A person who is skilled in the art of resin saturated fiberglas can build a product to the customers specifications instead of the customer trying to match the builders product to his particular needs.

BRIEF DESCRIPTION OF THE DRAWINGS

FIG. 4. shows the product being used in swimming pool construction aluminum side in.

DETAILED DESCRIPTION OF THE INVENTION

Figure 1:
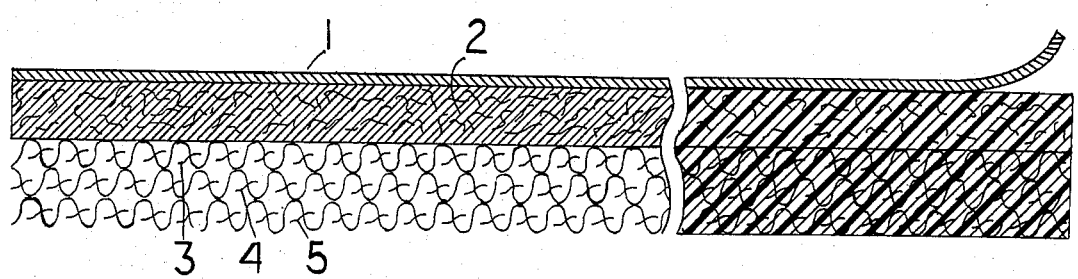
FIG. 1. is a section view without and with resin added.
Figure 2:
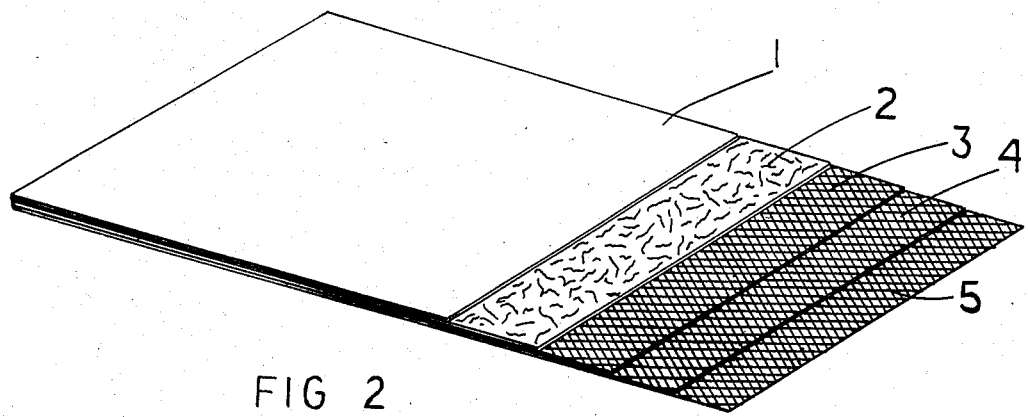
FIG. 2. is an elevation of the product.
Figure 3:
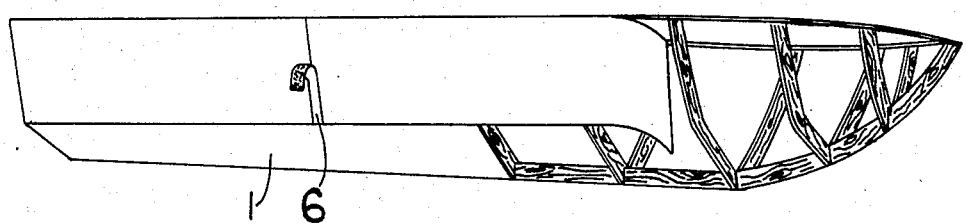
FIG. 3. shows the product being used in boat construction aluminum side out.
Figure 4:
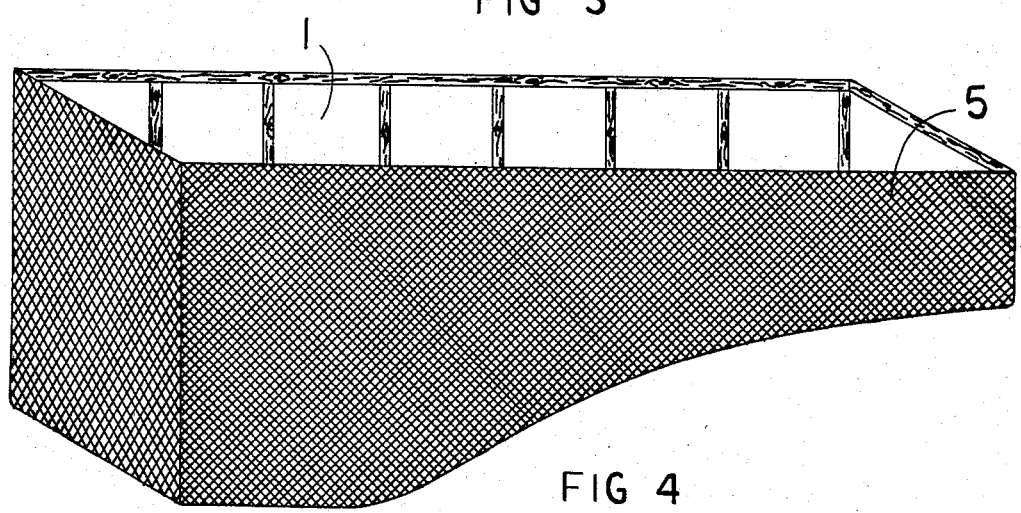

The product consists of the following #1 a sheet of aluminum 0.005 to 0.008 of an inch thick. #2 a fiberglas mat of varying thickness for large or small jobs and for a smooth finish when the aluminum is removed. #3 #4 #5 are layers of fiberglas cloth of varing sizes according to the needs of the particular job. The layers are held together with resin glue in the same manner as ceiling tile or duct board. #6 is aluminum tape being applied to the joints on the aluminum side. FIG. 3. shows a boat being built using a wood frame of pressure treated pine. The deck and hull will be monolectic and the wood will remain in place for the life of the boat. Steel, pvc pipe, or aluminum can also be used for a frame. The product will be made in 4 feet×10 feet sheets and nailed or screwed to the frame. The joints are then taped together. Fiberglas resin is then injected into the cloth side of the product under light pressure. After the resin dries the aluminum is peeled off and sold to a recycler. FIG. 4. shows a swimming pool being made inside out to the boat construction. The aluminum is taped to the frame stringers with duct tape or aluminum tape. The joints are taped on the aluminum side, resin is injected into the cloth. When the resin dries the frame is removed and reused. The aluminum is peeled off and recycled. A sheet of copper of the same thickness as the aluminum can be used and the inside roughed up so it will bond to the resin and left on the boat below the water line for anti fouling protection.

I claim:

1. A semi ridged composite sheet consisting of a sheet of aluminum bonded to a sheet of mat fiberglas which is bonded to several layers of fiberglas cloth.

2. A semi ridged composite sheet consisting of a sheet of cooper bonded to a sheet of mat fiberglas which is bonded to several layers of fiberglas cloth.

3. A semi ridged composite sheet consisting of a sheet of paper board bonded to a semi ridged sheet of mat fiberglas which is bonded to several layers of fiberglas cloth.

* * * * *

UNITED STATES PATENT AND TRADEMARK OFFICE
CERTIFICATE OF CORRECTION

PATENT NO. : 4,574,106
DATED : March 4, 1986
INVENTOR(S) : Jimmy Harold Rogers

It is certified that error appears in the above-identified patent and that said Letters Patent is hereby corrected as shown below:

In the Title and through-out the Patent, The word Fiberglas should read Fiberglass.

In Claim 2, second line, the word cooper should read copper.

Signed and Sealed this

Tenth Day of February, 1987

*Attest:*

DONALD J. QUIGG

*Attesting Officer*  *Commissioner of Patents and Trademarks*